United States Patent [19]

Nishiki

[11] Patent Number: 5,406,610
[45] Date of Patent: Apr. 11, 1995

[54] X-RAY DIAGNOSTICS APPARATUS WITH CORRECTION MEANS

[75] Inventor: Masayuki Nishiki, Tochigiken, Japan

[73] Assignee: Kabushiki Kaisha Toshiba, Kawasakishi, Japan

[21] Appl. No.: 159,307

[22] Filed: Nov. 30, 1993

[30] Foreign Application Priority Data

Nov. 30, 1992 [JP] Japan ................... 4-319863

[51] Int. Cl.$^6$ ................... H04N 5/321; H01J 31/50
[52] U.S. Cl. ................... 378/98.12; 378/98
[58] Field of Search ................... 378/98.2, 98.3, 98.7, 378/98.8, 98.12, 62

[56] References Cited

U.S. PATENT DOCUMENTS

| 4,503,460 | 3/1985 | Sklebitz | 378/98.8 |
| 4,613,983 | 9/1986 | Yedid et al. | 378/98.2 X |
| 5,123,056 | 6/1992 | Wilson | 378/98.6 X |

FOREIGN PATENT DOCUMENTS 3-13078  1/1991  Japan .

Primary Examiner—David P. Porta
Attorney, Agent, or Firm—Oblon, Spivak, McClelland, Maier, & Neustadt

[57] ABSTRACT

An X-ray diagnostics apparatus in which sensitivity of an overlapped image is uniform everywhere. The X-ray diagnostics apparatus includes: a first image sensing device which senses analog image; a first A-D converter which converts the analog image obtained by the first image sensing device to a digital image; a first memory which stores digital-converted image data obtained by the first A-D converter; a second image sensing device which senses an analog image; a second A-D converter which converts the analog image obtained by the second image sensing device to a digital image; a second memory which stores digital-converted image data obtained by the second A-D converter; a divider unit which generates coefficient in which the image data stored in the first memory is divided by the image data stored in the second memory; line memory which stores the generated coefficient; and composite image memory which overlapps image data obtained by the first memory and the second memory in a manner that the coefficient is multiplied to the image data in the second memory for each line.

7 Claims, 4 Drawing Sheets

X-RAY DIAGNOSTICS APPARATUS WITH CORRECTION MEANS

BACKGROUND OF THE INVENTION

1. Technical Field

The present invention relates to an X-ray diagnostics apparatus, and it particularly relates to a technique for processing a synthesized image area obtained by a television camera unit that utilizes a CCD (charge coupled device) image plate.

2. Background Art

In the X-ray diagnostics apparatus, X-rays are irradiated to an object such as a human body, and an X-ray image permeated through the object is converted to an optical image. The optical image is converted to a television image signal which is then displayed on a picture plane of a monitor as a fluoroscopic image. The fluoroscopic image displayed on the monitor is utilized for diagnosis of a medical patient.

In other words, the X-ray diagnostics apparatus basically consists of:

an X-ray tube for irradiating the X-rays toward the object;

an image intensifier (hereinafter simply referred to as I. I.) for converting the body-permeated X-ray image to the optical image;

a television camera unit for converting the optical image outputted from the I.I, to the television image signal; and a monitor which displays the television image signal output from the television camera as the fluoroscopic image.

The television camera recently in use utilizes generally a fixed charge-coupled-device (CCD) image plate where the optical image is converted to the television image signal by means of photosensitive conversion.

Since there is limit for the number of pixels available for a single image plate, there is caused a problem where resolution degree for the image obtained by the single image plate for the television camera is not sufficient in order to see the image properly. In view of such a problem and in order to improve the resolution degree for the image, there is used a television camera equipped with two image plates 1, 2, lenses 11a, 11b, 11c and half mirror 12, as shown in FIG. 1.

Referring to FIG. 1, the optical image output from I.I 10 is formed in a lower-end portion of image plate 1 through lens 11a, half mirror 12 and lens 11b. Simultaneously, the optical image output from I.I 10 is also formed in a left-end portion of image plate 2 through lens 11a, half mirror 12 and lens 11c.

With reference to FIG. 2, when image plates 1, 2 are overlapped in a manner illustrated in FIG. 2, a single image is constituted by two image plates. Thereby, the resolution power therefor is improved as approximately twice as precise, compared to that obtained by using only single image plate.

However, there is caused a following problem even in utilizing two image plates. A distribution factor is not equal between lens 11b and lens 11c whose respective arriving rays are reached thereto through half mirror 12. Besides, sensitivity for CCD per se differs between respective image plates 1, 2.

In view of the above drawbacks and in order to equalize outputs from respective plates 1, 2, the same applicant offers a television camera in which average values output from image plates 1, 2 are made equal, in Japanese Patent Laid Open Helsel-3-13078 (filed on 9 Jun., 1993).

In the Japanese Patent Application 3-13078, a method is disclosed by which each average value for output of each image plate is made equal between image plates 1, 2. In other words, the average image density for two image plates is made equal in an area which is overlapped by both two image plates 1, 2. However, there is a drawback in the Japanese Patent Application 3-13078. That is, a density change (so-called shading) due to local sensitivity deviation for respective image plates 1, 2 cannot be corrected.

Namely, even if the averaged values for the outputs from respective image plates 1, 2 are equal, sensitivity distribution for each location at image plates 1, 2 are not even in general. FIG. 3 illustrates such an uneven sensitivity distribution where a vertical line indicates the sensitivity and a horizontal line corresponds to position and location of the image plates substantially taken along lines A–A' shown in FIG. 2. In FIG. 3, a solid curve specified by CCD1 shows the sensitivity of image plate 1, whereas a broken curve CCD2 the sensitivity of image plate 2.

Referring to a graph shown in FIG. 3, image plate 2 is brighter than image plate 1 in a left-half side of the image, while image plate 1 is brighter than image plate 1 in a right-half side of the image. As a result thereof, uniformity of the image as a whole is lost, thus giving an viewer somehow a feeling of physical disorder.

SUMMARY OF THE INVENTION

In view of the foregoing drawbacks, it is therefore an object of the present invention to provide an X-ray diagnosis apparatus so that non-uniformity of the image caused by different distribution of sensitivity along a boundary area overlapped by the two image plates is removed so as to obtain a synthesized image whose sensitivity is uniform everywhere.

To achieve the object, there is provided an X-ray diagnostics apparatus, comprising: first means for sensing an analog image; first converting means for converting the analog image obtained by the first sensing means to a digital image; first memory means for storing digital-converted image data obtained by the first sensing means; second means for sensing an analog image; second converting means for converting the analog image obtained by the second sensing means to a digital image; second memory means for storing digital-converted image data obtained by the second sensing means; means for generating coefficient in which the image data stored in the first memory means is divided by the image data stored in the second memory means; line memory means for storing the generated coefficient in the coefficient generating means; and overlapping means for overlapping image data obtained by the first memory means and the second memory means in a manner that the coefficient is multiplied with the image data in the second memory means for each line.

Other features and advantages of the present invention will become apparent from the following description taken in conjunction with the accompanying drawings.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

Figure 4:
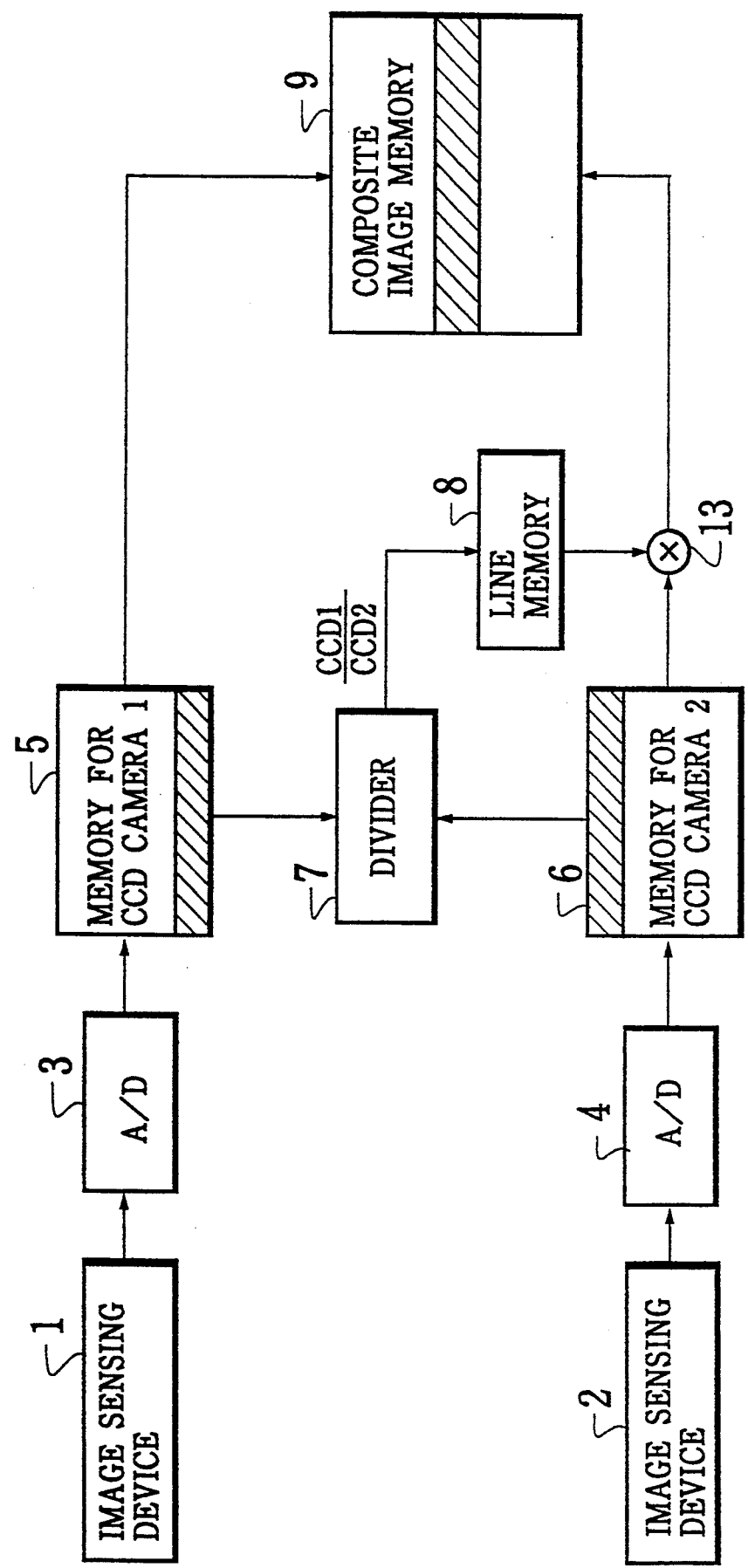
FIG. 4 shows schematically a configuration of X-ray diagnostics apparatus according to the present invention.

FIG. 4 shows schematically a configuration of an X-ray diagnostics apparatus according to the present invention. In the same figure, an analog video signal output at image pickup device 1 is A-D converted to digital signal by A-D converter 3. Then, the A-D converted signal is stored in memory 5 for CCD camera 1. An analog video signal output from image pickup device 2 is also A-D converted to a digital signal by A-D converter 4. Then, the A-D converted signal is stored in memory 6 for CCD camera 2. Respective image data stored at each memory 5, 6 are synthesized so as to be written to composite image memory 9.

Each image datum for an overlapped and synthesized area taken along line A–A' (in FIG. 2) is read out from memory 5 for CCD camera 1 so as to be transferred to divider 7.

Figure 6:
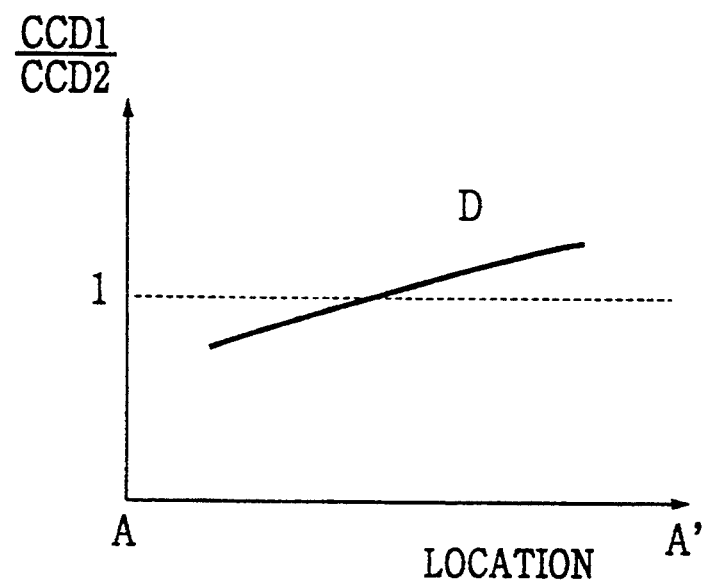
FIG. 6 is a graph showing operation of divider 7, where horizontal axis represents position along line cut along line A–A' shown in FIG. 2, whereas the vertical axis represents a value of division where the image data which is obtained by CCD camera 1 and A-D converted, is divided by that which is obtained by CCD camera 2 and A-D converted.

In divider T, division represented by ri=CCD1/CCD2 is carried out, and calculation result of ri for i=1 through N is outputted to line memory 8, where i denotes a picture element address on a line of synthesized area along line A–A', CCD1 represents output obtained in each position determined by coordinate (xi, yi). The ri serves as a correction coefficient or sensitivity factor. For example, when the number of picture elements N is 1000, the number of quotients ri obtained by the division is 1000. Referring to FIG. 6, solid curve denoted by D represents an example of the calculation result which is stored temporarilly at line memory 8.

When data stored in respective memories 5, 6 obtained by CCD camera 1 and CCD camera 2 are synthesized, data for memory 5 for CCD camera 1 remains inpact, while a content of line memory 8 is multiplied with the data for memory 6 for CCD camera 2 by multiplier 13.

In other words, when the image data of memory 5 at the i-th image element located at j-th line is represented as o1(i, j) and the image data of memory 6 as o2(i, j), (ri)·(o2(i, j)) is calculated for the j-th line, where i=1 through N.

It is preferred that a division result obtained by divider 7 that is the content of line memory 8 is updated anew every time a new image data frame is generated from both image sensing devices 1, 2, so as to be adopted for an image data frame obtained immediately thereafter.

It is also preferred that such an image correction process is executed by digital processing.

However, there may be a case where it is not possible to obtain the division result ri and to process (ri)·o2(i, j) (i=1−N) within a limited time duration of a single frame selected from the overlapped area. Generally, a single-frame duration is approximately 30 msec. In that case, there may be utilized the calculation result ri obtained from image data which is one frame precedent to that. In this case too, performance of the image correction can be effective as the mentioned before.

It shall be appreciated that the same advantageous effect can be obtained even though the roles played by CCD camera 1 and CCD camera 2 are reversed.

In the above embodiment, correction coefficient or sensitivity factor ri is obtained from single-line data along the synthesized (overlapped) image. In another embodiment, accumulated results from plural-line data are utilized as follows.

By utilizing the accumulated results of data obtained from the plural-line data, accuracy represented as the S/N ratio for data is improved. In this embodiment, a division process therefor is expressed by the following equation:

$$ri = \left\{ \sum_{j=1}^{M} o1(i, j) \right\} / \left\{ \sum_{j=1}^{M} o2(i, j) \right\}$$

where M denotes the number of lines such as M=20.

Figure 5:
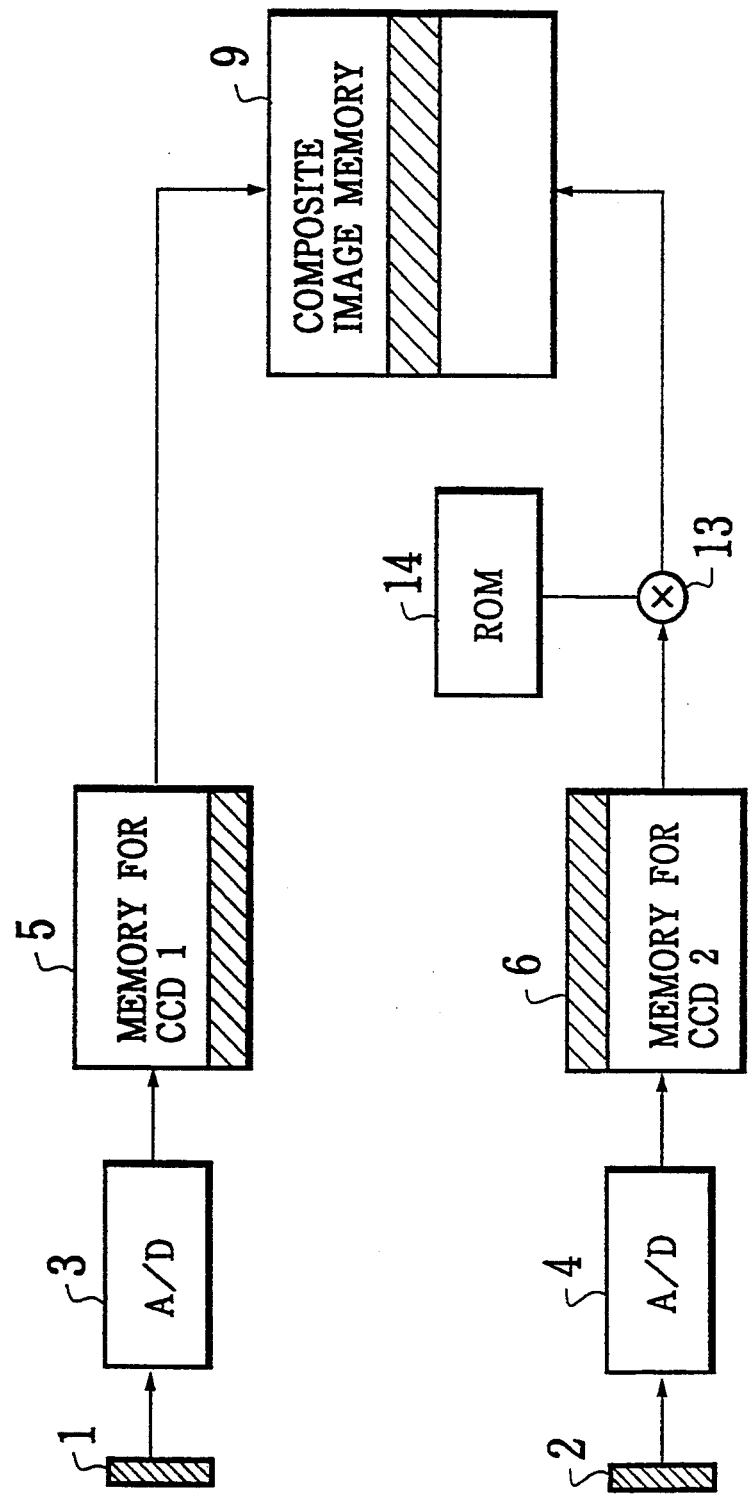
FIG. 5 shows another embodiment according to the present invention.

FIG. 5 shows still another embodiment according to the present invention. In the same figure, the same elements as in FIG. 4 are given identical reference numerals.

In this embodiment, attention is directed to the fact that a sensitivity distribution along the overlapped (synthesized) area by image sensing devices 1, 2 remains almost unchanged in terms of time lapse as well as incident light quantity. Taking advantage of such a fact, ri (i=1 through N) is measured in advance of real usage of the X-ray diagnostics device. Then measured data are stored in ROM (read only memory) 14 or the like. Accordingly, there is no need to equip divider 7 in the television camera. Thus, overall configuration is simplified and down-sized.

Figure 1:
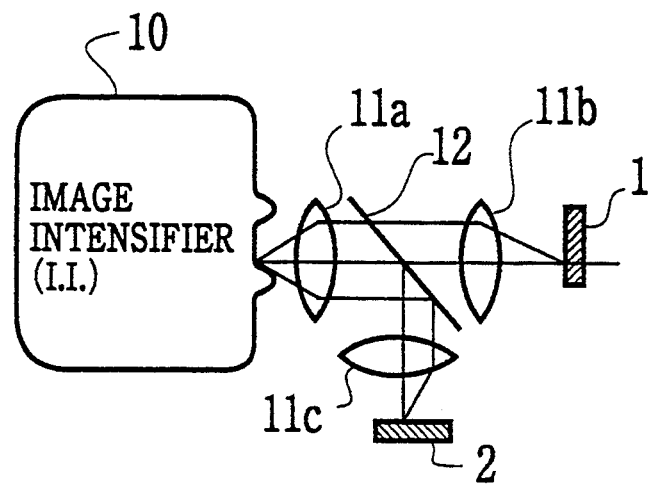
FIG. 1 is a television camera equipped with two image plates 1, 2, lens 11a, 11b, 11c and half mirror 12.
Figure 2:
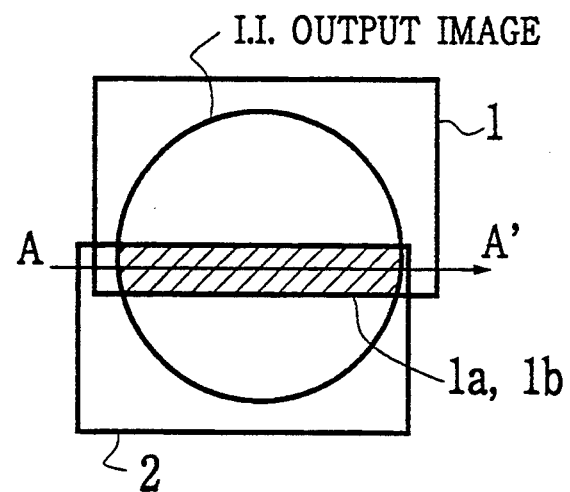
FIG. 2 shows a synthesized image area (hatched area) by combining two image plates 1, 2.
Figure 3:
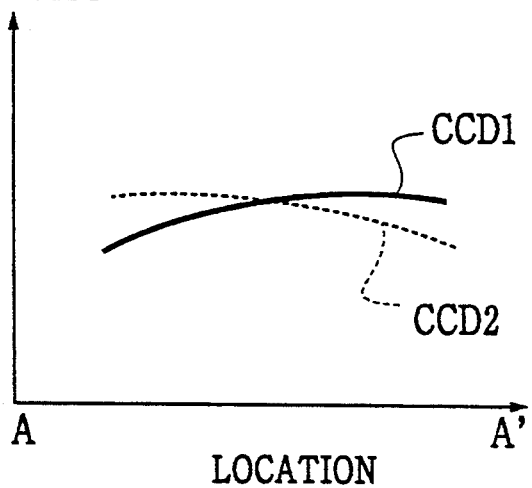
FIG. 3 is a graph illustrating an uneven sensitivity distribution where a vertical line indicates the sensitivity and a horizontal line corresponds to position and location of the image plates substantially taken along lines A–A' shown in FIG. 2.

FIG. 6 is a graph showing operation of divider 7, where the horizontal axis corresponds to position along line cut along line A–A' shown in FIG. 2, whereas the vertical axis corresponds to a value of division where the image data which is obtained by CCD camera 1 and A-D converted, is divided by that which is obtained by CCD camera 2 and A-D converted.

Figure 7:
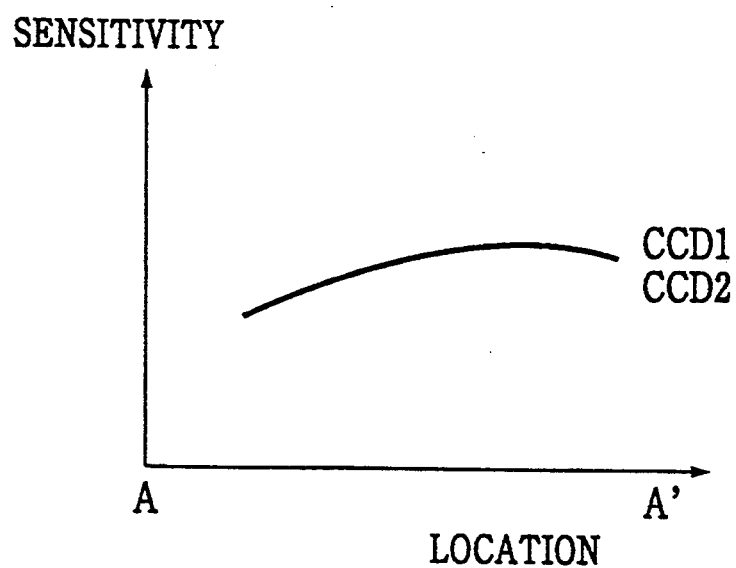
FIG. 7 is a graph showing the results after which the synthesizing and the correction are performed on the data in FIG. 6, where the horizontal axis represents position along line cut along line A–A' shown in FIG. 2, whereas the vertical axis represents the sensitivity thereof.

FIG. 7 is a graph showing the results after which the synthesizing and the correction are performed on the data in FIG. 6, where the horizontal axis corresponds to position along line cut along A-A' shown in FIG. 2, whereas the vertical axis corresponds to the sensitivity thereof.

In summary, by employing the X-ray diagnostics apparatus in which the image data is corrected so that the sensitivity distribution along the synthesized area is made uniform, the change in density of displayed image at the overlapped and synthesized area is presented very smoothly. As a result, obtained is the synthesized image having uniform density thereof. Thereby, performance efficiency and quality of the X-ray diagnostics apparatus are significantly improved. Moreover, by the significantly improved accuracy of the image quality, serious diseases such as a blood-vessel disorder and cancer can be easily and feasibly discovered. In particular, when such a disease lies on an artifact position as in the convention device, the apparatus according to the present invention plays a most effective role in pinpointing the location of the disease to be immediately cured.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An x-ray diagnostics apparatus, comprising:
   first sensing means for sensing a first image and generating first analog image data;
   first converting means for converting said first analog image data obtained by said first sensing means to first digital image data;
   first memory means for storing said first digital image data obtained by said first converting means;
   second sensing means for sensing a second image and generating second analog image data;
   second converting means for converting said second analog image data obtained by said second sensing means to second digital image data;
   second memory means for storing said second digital image data obtained by said second converting means;
   coefficient generating means for generating a coefficient in which said first image data stored in said first memory means is divided by said second image data stored in said second memory means;
   line memory means for storing said coefficient generated in said coefficient generating means; and
   overlapping means for overlapping said first and second image data obtained by said first memory means and said second memory means in a manner such that said coefficient is multiplied with said second image data stored in said second memory means for each line.

2. The apparatus of claim 1, wherein said overlapping is achieved by digital processing.

3. The apparatus of claim 1, wherein said overlapping means includes means for overlapping image data of a plurality of picture element lines.

4. The apparatus of claim 1, wherein said coefficient is generated in a manner such that said second image data stored in said second memory means is divided by said first image data stored in said first memory means, and wherein, utilizing a coefficient thus obtained, overlapped image data is obtained in a manner such that said coefficient is multiplied with said first image data.

5. An X-ray diagnostics apparatus, comprising:
   first sensing means for sensing a first image and generating first analog image data;
   first converting means for converting said first analog image data obtained by said first sensing means to first digital image data;
   first memory means for storing said first digital image data obtained by said first converting means;
   second sensing means for sensing a second image and generating second analog image data;
   second converting means for converting said second analog image data obtained by said second sensing means to second digital image data;
   second memory means for storing said second digital image data obtained by said second converting means;
   third memory means for storing coefficients generated by separate coefficient generating means in a manner such that said first image data stored in said first memory means is divided by said second image data stored in said second memory means; and
   overlapping means for overlapping said first and second image data obtained by said first memory means and said second memory means in a manner such that said coefficient is multiplied with said second image data stored in said second memory means.

6. The apparatus of claim 5, wherein said overlapping is achieved by digital processing.

7. The apparatus of claim 5, wherein said overlapping means includes means for overlapping image data of a plurality of picture element lines.

* * * * *